(12) United States Patent
Okada et al.

(10) Patent No.: US 9,130,220 B2
(45) Date of Patent: Sep. 8, 2015

(54) POWER SOURCE APPARATUS EQUIPPED WITH A SERVICE PLUG AND VEHICLE CARRYING THAT POWER SOURCE APPARATUS

(75) Inventors: Wataru Okada, Kobe (JP); Shinsuke Nakamura, Kobe (JP); Akinobu Wakabayashi, Kobe (JP); Tomoyuki Ohmura, Kakogawa (JP)

(73) Assignee: SANYO ELECTRIC CO., LTD., Osaka (JP)

(*) Notice: Subject to any disclaimer, the term of this patent is extended or adjusted under 35 U.S.C. 154(b) by 911 days.

(21) Appl. No.: 13/331,527

(22) Filed: Dec. 20, 2011

(65) Prior Publication Data

US 2012/0164489 A1 Jun. 28, 2012

(30) Foreign Application Priority Data

Dec. 24, 2010 (JP) ................... 2010-287098

(51) Int. Cl.
| | |
|---|---|
| H01M 10/46 | (2006.01) |
| H01M 2/20 | (2006.01) |
| B60L 11/18 | (2006.01) |
| H01M 2/10 | (2006.01) |
| H01M 10/625 | (2014.01) |
| H01M 10/613 | (2014.01) |
| H01M 10/658 | (2014.01) |

(52) U.S. Cl.
CPC ........... *H01M 2/206* (2013.01); *B60L 11/1818* (2013.01); *B60L 11/1853* (2013.01); *H01M 2/1077* (2013.01); *H01M 2/1094* (2013.01); *H01M 10/46* (2013.01); *H01M 10/613* (2015.04); *H01M 10/625* (2015.04); *H01M 10/658* (2015.04); *Y02T 10/7005* (2013.01); *Y02T 10/705* (2013.01); *Y02T 90/14* (2013.01)

(58) Field of Classification Search
CPC ...................................... H01M 10/46
USPC ....................................... 429/121
See application file for complete search history.

(56) References Cited

U.S. PATENT DOCUMENTS

| | | | | |
|---|---|---|---|---|
| 6,225,153 | B1* | 5/2001 | Neblett et al. | 438/188 |
| 6,342,773 | B2* | 1/2002 | Sakaue et al. | 320/107 |
| 2007/0182363 | A1* | 8/2007 | Yang | 320/107 |
| 2009/0273310 | A1* | 11/2009 | Flack | 320/107 |
| 2010/0124847 | A1* | 5/2010 | Shiu et al. | 439/607.35 |

FOREIGN PATENT DOCUMENTS

JP 2004-7920 1/2004

OTHER PUBLICATIONS

Cables Unlimited USB2.0 Gold Connector Product Webpage Archive, available for sale on Amazon.com as of Nov. 26, 2009 as archived on web.archive.org.*

* cited by examiner

*Primary Examiner* — Jonathan G Leong
(74) *Attorney, Agent, or Firm* — Wenderoth, Lind & Ponack, L.L.P.

(57) ABSTRACT

A power source apparatus provided with battery blocks (2) that have a plurality of battery cells (1) connected together, an outer case (3) that houses the battery blocks and/or electrical components connected to the battery blocks, a socket (4) connected in series with the battery blocks and disposed on the outer case, and a service plug (5) that connects with the socket in a removable manner. The service plug connects with the socket to connect the service plug in series with the batteries via the socket. The outer case is provided with a socket and service plug thermal isolation region (8) sectioned-off by a heat-shielding plate (7), and the socket and service plug are disposed in the thermal isolation region.

11 Claims, 11 Drawing Sheets

FIG. 7
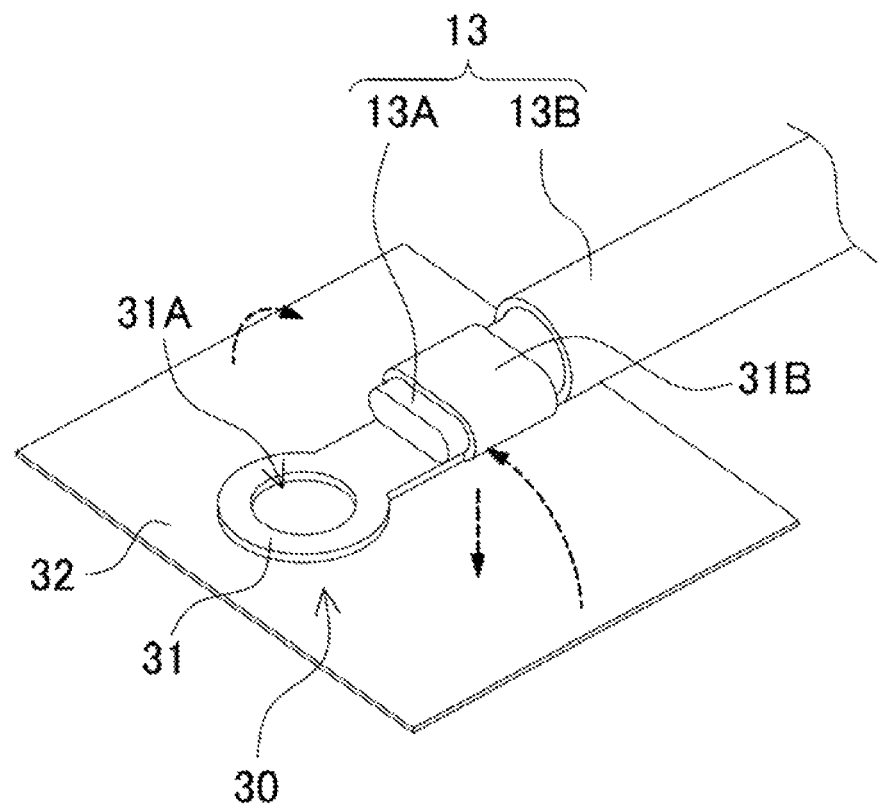
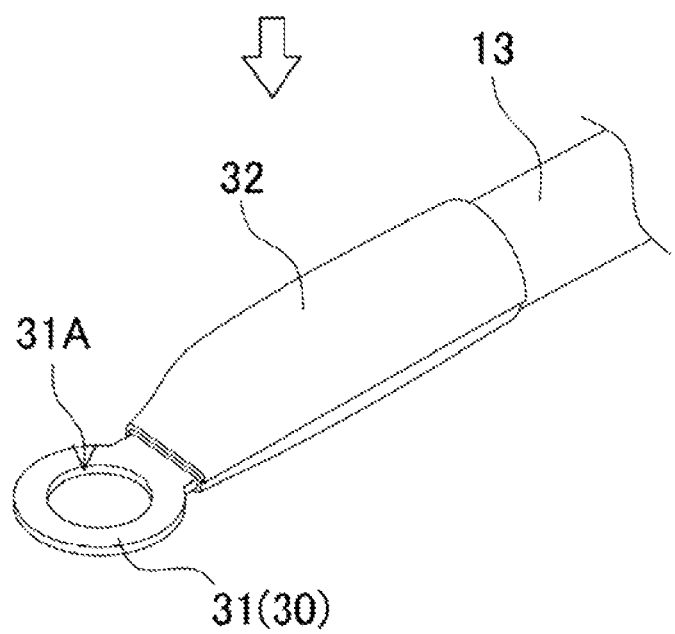

POWER SOURCE APPARATUS EQUIPPED WITH A SERVICE PLUG AND VEHICLE CARRYING THAT POWER SOURCE APPARATUS

BACKGROUND OF THE INVENTION

1. Field of the Invention

The present invention relates to a power source apparatus used primarily as the power source for a motor that drives a vehicle such as a hybrid or electric vehicle, and to a vehicle with the power source apparatus installed on-board.

2. Description of the Related Art

Vehicles such as electric vehicles (EVs, electric cars, electric automobiles) driven by an electric motor, or hybrid vehicles (HVs, hybrid electric vehicles, HEVs, hybrid cars) driven by both an electric motor and an engine, carry a high capacity power source apparatus on-board to supply power to the driving motor. To attain an output that can drive a vehicle with an electric motor, the power source apparatus has numerous battery cells connected in series to increase the output voltage. During inspection and maintenance, or when the power source apparatus is not installed in the vehicle, exposure of high-voltage areas of the power source apparatus such as high-voltage output terminals presents a safety hazard. To avoid this safety hazard, a battery system has been developed with a service plug connected in series with the batteries. In this battery system, output voltage can be shut-off by removing the service plug. Since the service plug can be removed to shut-off output voltage during maintenance operations, those operations can be performed safely.

The service plug is connected in a removable manner in a socket disposed on the case of the power source apparatus. Since the service plug is connected in series with the batteries and subject to high-current flow, arching can occur if the service plug is removed from the socket when high-current is flowing. To prevent the spread of flames from an arching service plug, a service plug has been developed housing a gas-jet source (such as an air-bag inflator) to eject a nonflammable gas into the service plug.

Refer to Japanese Laid-Open Patent Publication 2004-7920.

The service plug described above houses a gas-jet source that delivers a nonflammable gas and a controlling device that determines if conditions warrant gas delivery. The controlling device detects the conditions for gas introduction and injects nonflammable gas from the gas-jet source into the socket. In an emergency situation such as an automobile accident when the amount of acceleration (deceleration or impact) input from an accelerometer exceeds a preset value (such as the value for air-bag activation), the controlling device determines that the conditions for gas injection are satisfied when the speed sensor indicates that the vehicle is stopped, and the lever-switch that detects service plug removal is in the OFF state indicating service plug removal. Under those conditions, the controlling device activates the gas-jet source and injects a nonflammable gas such as nitrogen into the socket.

In addition to having an extremely complex structure, the service plug described above has flame-retarding gas introduced in situations assumed by detecting specific conditions. Consequently, depending on the conditions, the spread of flames may not be effectively prevented. In particular, since the service plug inserts into the socket to connect the batteries through a pair of plug-side connecting terminals (blades) that connect with receiving socket-side connecting terminals (receptacles), high current flow can heat the connecting regions to abnormally high temperatures when contact resistance is significant. The contact resistance of the connecting regions can increase over time. The contact resistance of the connecting regions between lead-wires connected to the batteries and the socket-side connecting terminals, and the contact resistance of the connecting regions between the plug-side and socket-side connecting terminals can become large. Lead-wires connected to the batteries are joined to metal socket-side connecting terminals by crimping, or the ends of the lead-wires are connected to crimped terminals that are screw-attached to the socket-side connecting terminals. Plug-side connecting terminals resiliently press into the socket-side connecting terminals for connection. With this connecting region configuration, contact resistance increase due to vibration and aging cannot be neglected. When contact resistance increases, the connecting regions over-heat due to Joule-heating, which is proportional to the square of the current times the contact resistance. This leads to detrimental effects including the possibility of smoke and flame generation and the associated spread of fire to ignite other regions. In particular, since current flow in a vehicle power source apparatus is greater than or on the order of 100 A, Joule-heating proportional to the square of the current becomes extremely high even with a small increase in contact resistance and this can result in detrimental effects such as fire ignition.

The present invention was developed considering this background. Thus, it is a primary object of the present invention to provide a power source apparatus and vehicle carrying the power source apparatus that can demonstrably improve reliability by effectively preventing the spread of detrimental effects due to over-heating of the connecting regions between the service plug and socket while employing an extremely simple structure.

SUMMARY OF THE INVENTION

The power source apparatus of the present invention is provided with battery blocks 2 that have a plurality of battery cells 1 connected together, an outer case 3 that houses the battery blocks 2 and/or electrical components 10 connected to the battery blocks 2, a socket 4 connected in series with the battery blocks 2 and disposed on the outer case 3, and a service plug 5 that connects with the socket 4 in a removable manner. The service plug 5 connects with the socket 4 to connect the service plug 5 in series with the batteries via the socket 4. The outer case 3 is provided with a socket 4 and service plug 5 thermal isolation region 8 sectioned-off by a heat-shielding plate 7, and the socket 4 and service plug 5 are disposed in the thermal isolation region 8.

The power source apparatus described above has the characteristic that it can demonstrably improve reliability by effectively preventing the spread of detrimental effects due to over-heating of the connecting regions between the service plug and socket while employing an extremely simple structure. This is because the socket and service plug are disposed in a thermal isolation region formed by a heat-shielding plate. In this power source apparatus, even if contact resistance increases in the connecting regions between the socket and service plug and high current flow heats the connecting regions to abnormally high temperatures or to a state that can ignite a fire, the spread of heat or flames to other regions is prevented and safety improved because the heat-shielding plate thermally isolates the socket and service plug from other regions. In addition, since the socket and service plug connecting regions are isolated by the heat-shielding plate, even if socket or service plug plastic resin is heated to melting, detrimental effects caused by the flow of resin into other regions is also avoided.

In the power source of the present invention, the heat-shielding plate 7 establishes the thermal isolation region 8, which is configured as an opening in the outside of the outer case 3, and the socket 4 can be attached in that thermal isolation region 8. This power source apparatus can effectively prevent the spread of detrimental effects due to service plug and socket over-heating while allowing the service plug to easily be attached and detached from the outside of the outer case.

In the power source of the present invention, the heat-shielding plate 7 can be made of metal. In this power source apparatus, even if socket and service plug connecting regions attain an abnormally high temperature, the heat-shielding plate will not distort with heating, the spread of detrimental effects due to socket and service plug over-heating can be stably averted, and the socket can be solidly attached and protected.

The power source of the present invention can have a heat-shielding plate 7 that is non-magnetic material. In this power source apparatus, although magnetic fields associated with high current flow through the service plug can induce low-level vibration in the heat-shielding plate, a non-magnetic heat-shielding plate can suppress the low-level vibration and prevent generation of annoying noise.

In the power source of the present invention, the heat-shielding plate 7 that forms the thermal isolation region 8 has feed-through holes 24 to run lead-wires 13, the lead-wires 13 are passed through the feed-through holes 24, and the feed-through holes 24 are sealed closed in an air-tight and insulating manner. In this power source apparatus, since the feed-through holes are sealed closed in an air-tight manner after passing the lead-wires through the holes, the introduction of air into the thermal isolation region through the feed-through holes can be prevented. This has the characteristic that even if over-heating occurs in the connecting regions of the socket and service plug disposed in the thermal isolation region on the inside of the feed-through holes, the supply of oxygen from the outside can be cut-off, combustion can be restrained, and fire ignition can be suppressed.

The power source of the present invention can have perimeter side-walls 25 established along the insides of the feed-through holes 24. In this power source apparatus, the contact area between the lead-wires and feed-through hole perimeter surfaces can be increased by the perimeter side-walls established around the feed-through holes. Not only can damage to lead-wire insulation by edges on the feed-through hole openings be effectively avoided by contacting the lead-wires over a wide area, but the lead-wires can also be retained in a stable manner by pressure applied over a wide area on the sides of the lead-wires.

In the power source of the present invention, the thermal isolation region 8 can be formed by a heat-shielding plate 7 that divides into a plurality of pieces, and the feed-through holes 24 can be established on the boundaries of the plurality of heat-shielding plate pieces 7A, 7B. This power source apparatus has the characteristic that the lead-wires can be easily guided through the feed-through holes by dividing the thermal isolation region.

In the power source of the present invention, the outer case 3 with the socket 7 attached can contain an output cut-off 11 connected in series with the battery blocks 2, a current detection section to detect battery cell 1 current, and/or a circuit board carrying electronic circuitry connected to the battery cells 1. This power source apparatus has the characteristic that even if the socket and service plug connecting regions become over-heated or cause flame ignition, the contents of the outer case such as the output cut-off, the battery cell current detection section, and/or electronic circuitry connected to the battery cells can be protected The vehicle installed with the power source apparatus of the present invention can carry on-board the power source apparatus described above. The above and further objects of the present invention as well as the features thereof will become more apparent from the following detailed description to be made in conjunction with the accompanying drawings.

BRIEF DESCRIPTION OF THE DRAWINGS

FIG. 7 is a perspective view showing the connecting region of a lead-wire and connector being covered with heat-insulating sheet;

DETAILED DESCRIPTION OF THE INVENTION

The following describes embodiments of the present invention based on the figures. However, the following embodiments are merely specific examples of a power source apparatus and vehicle carrying that power source apparatus representative of the technology associated with the present invention, and the power source apparatus and vehicle carrying that power source apparatus of the present invention is not limited to the embodiments described below. Further, components cited in the claims are in no way limited to the components in the embodiment.

The power source apparatus of the present invention is primarily installed on-board a hybrid vehicle or electric vehicle and is most appropriately used as a power source to supply power to the electric motor that drives the vehicle. However, the power source apparatus of the present invention is not limited to automotive applications and can also be used as a power source for various equipment and machinery that require a source of high power.

Figure 1:
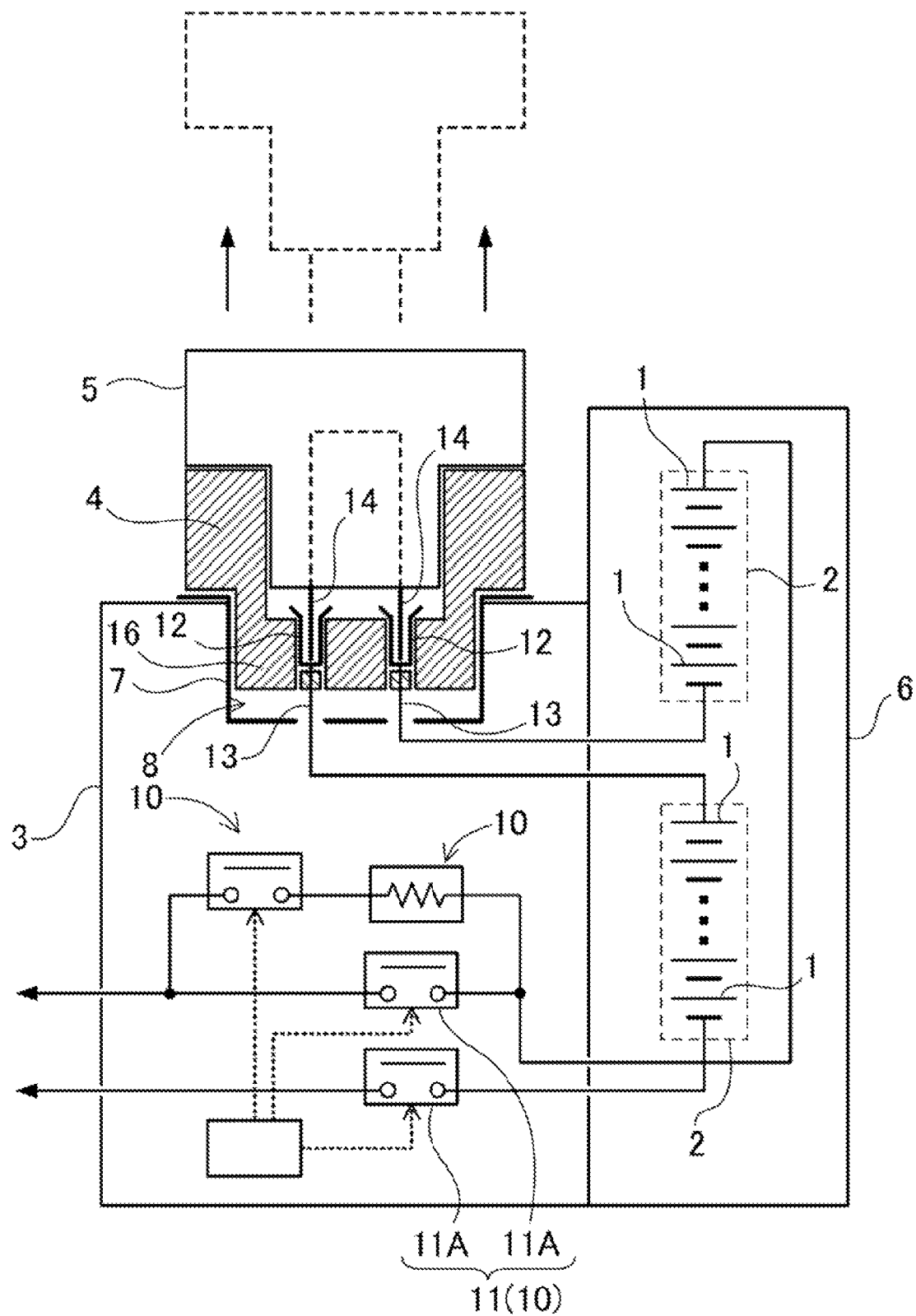
FIG. 1 is a schematic overview of a power source apparatus for an embodiment of the present invention.

The power source apparatus shown in the schematic overview of FIG. 1 is provided with battery blocks 2 that have a plurality of battery cells 1 connected in series, an outer case 3 that houses electrical components 10 connected to the battery blocks 2, a socket 4 connected in series with the battery blocks 2 and disposed on the outer case 3, and a service plug 5 that connects with the socket 4 in a removable manner. The service plug 5 connects in series between two battery blocks 2 via the socket 4. In this power source apparatus, the service plug 5 connects with the socket 4 completing a circuit path that connects the battery blocks 2 in series and establishes high-voltage at the output of the power source apparatus.

In the power source apparatus of FIG. 1, the battery cells 1 are housed in a battery case 6, and the electrical components 10 connected to the batteries, such as contactors 11A of the output cut-off 11, are housed in the outer case 3 where the service plug 5 inserts. The power source apparatus of the present invention can also house battery cells in the outer case where the service plug inserts. Further, electrical components other than the contactors, which make up the output cut-off, such as battery cell protection circuitry, a battery current detection circuit board, and a current detection section to detect battery cell current, can also be mounted in the outer case. In addition, the power source apparatus of the present invention can also house the battery blocks in the outer case where the service plug inserts, and house the electrical components in a different case.

In the power source apparatus of FIG. 1, the battery blocks 2 are housed in the battery case 6, and the electrical components 10 such as the output cut-off 11 connected to the batteries are housed in the outer case 3. When the service plug 5 is connected, the power source apparatus generates high-voltage at the output-side of the batteries. During operations such as maintenance and transport, work safety cannot be assured when the power source apparatus is outputting a high-voltage. To avert this hazard, the service plug 5 is removed from the socket 4 during operations such as maintenance and transport to put the power source apparatus in a state that does not generate high-voltage at the output-side of the batteries.

As shown in the schematic overview of FIG. 1, the service plug 5 is connected between the battery blocks 2, which have many battery cells 1 connected in series, and connects the two battery blocks 2 in series. If the service plug 5 is removed, connection of the positive-side battery block 2 to the negative-side battery block 2 is separated and battery output is cut-off. The service plug 5 is removed from the socket to shut-off high-voltage output.

Figure 2:
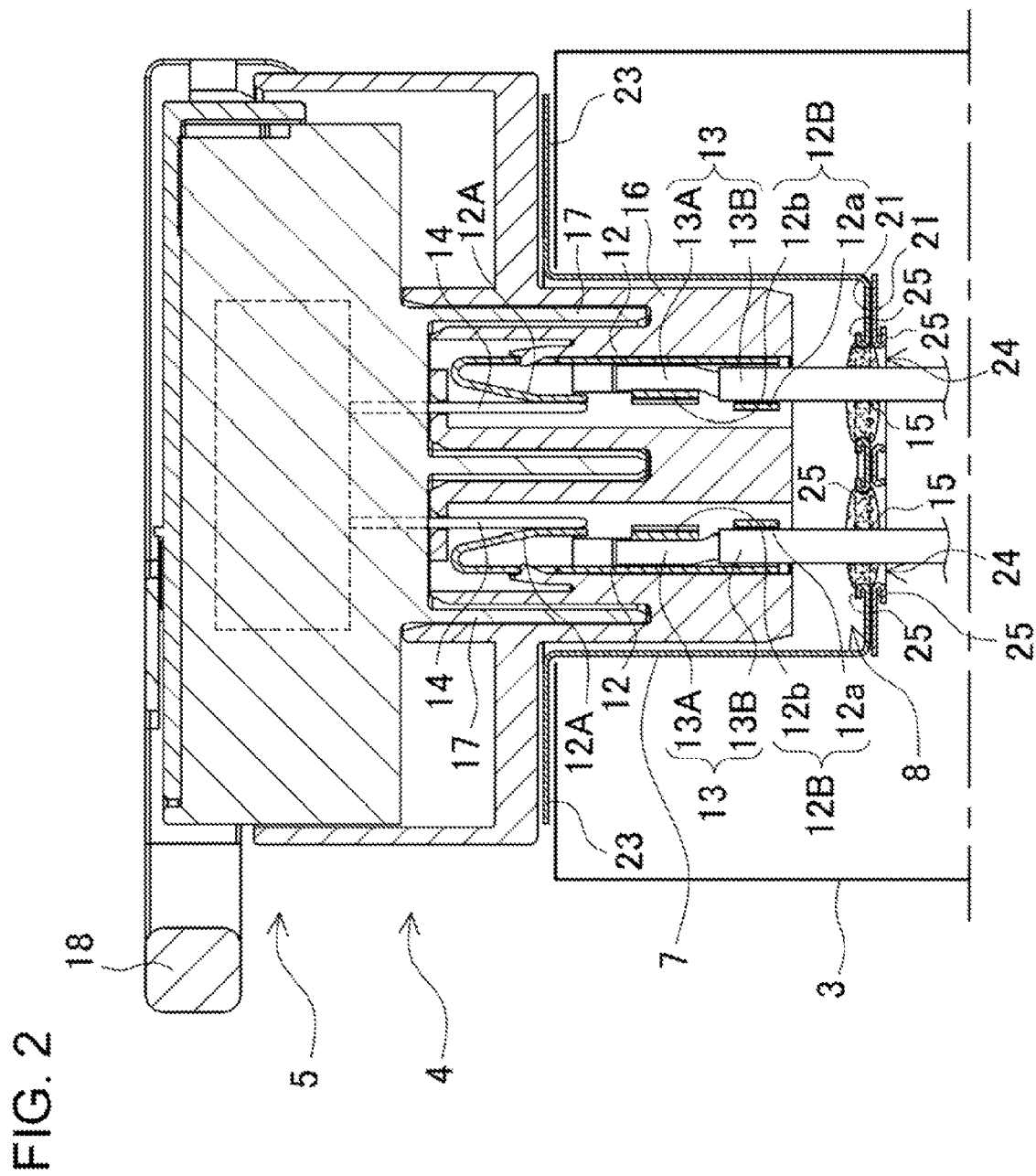
FIG. 2 is an enlarged cross-sectional view of the part of the outer case where the socket is mounted.
Figure 3:
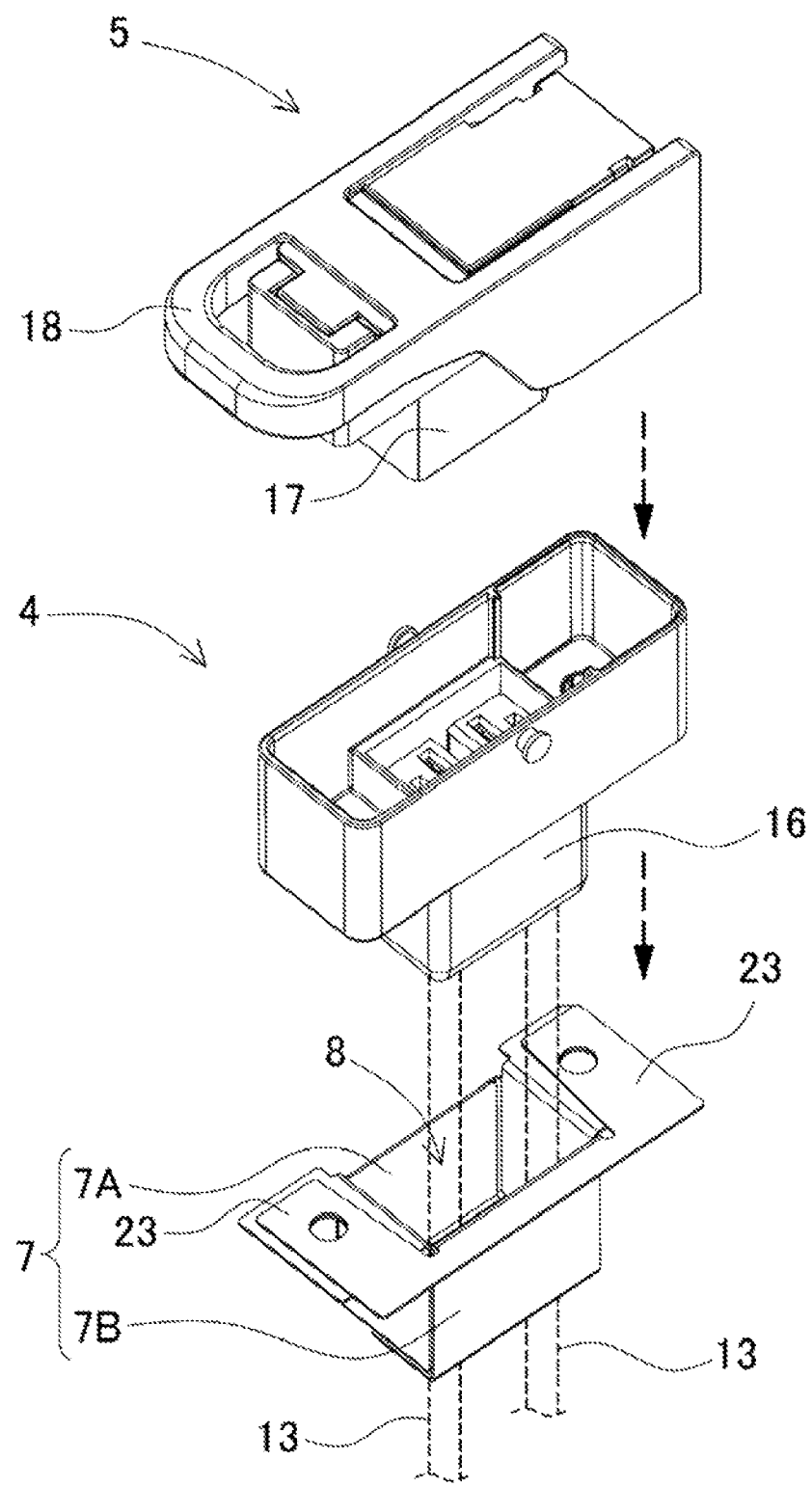
FIG. 3 is an exploded perspective view of the service plug, socket, and heat-shielding plate.
Figure 4:
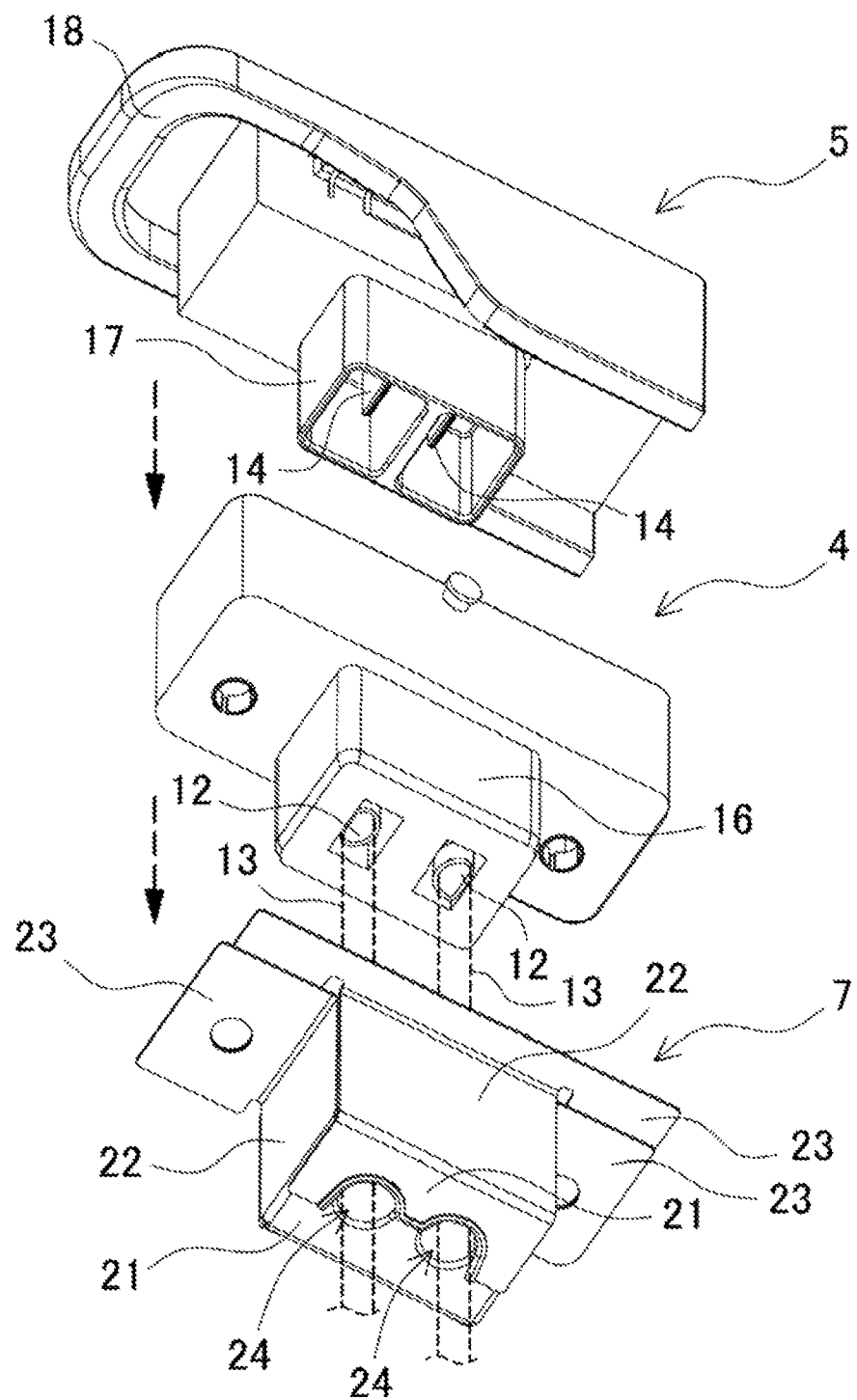
FIG. 4 is an exploded perspective view from below the service plug, socket, and heat-shielding plate shown in FIG. 3.

The socket 4 is mounted on the outer case 3 and receiving socket-side connecting terminals 12 connect to the batteries via lead-wires 13. FIG. 2 is a cross-section view of the part of the outer case 3 where the socket 4 is mounted. The outer case 3 of this figure has a heat-shielding plate 7 attached, and that heat-shielding plate 7 establishes a thermal isolation region 8 where the socket 4 and service plug 5 are disposed. The heat-shielding plate 7 is made by forming sheet metal such as iron, steel, or non-magnetic aluminum plate. As shown in FIGS. 2-4, the heat-shielding plate 7 is formed in a box-shape and establishes the thermal isolation region 8 as an open box-shaped region on the outside of the outer case 3. The socket 4 is mounted in the thermal isolation region 8 opening on the outside of the outer case 3, and the service plug 5 is attached in a removable manner on the outside of the outer case 3.

Figure 5:
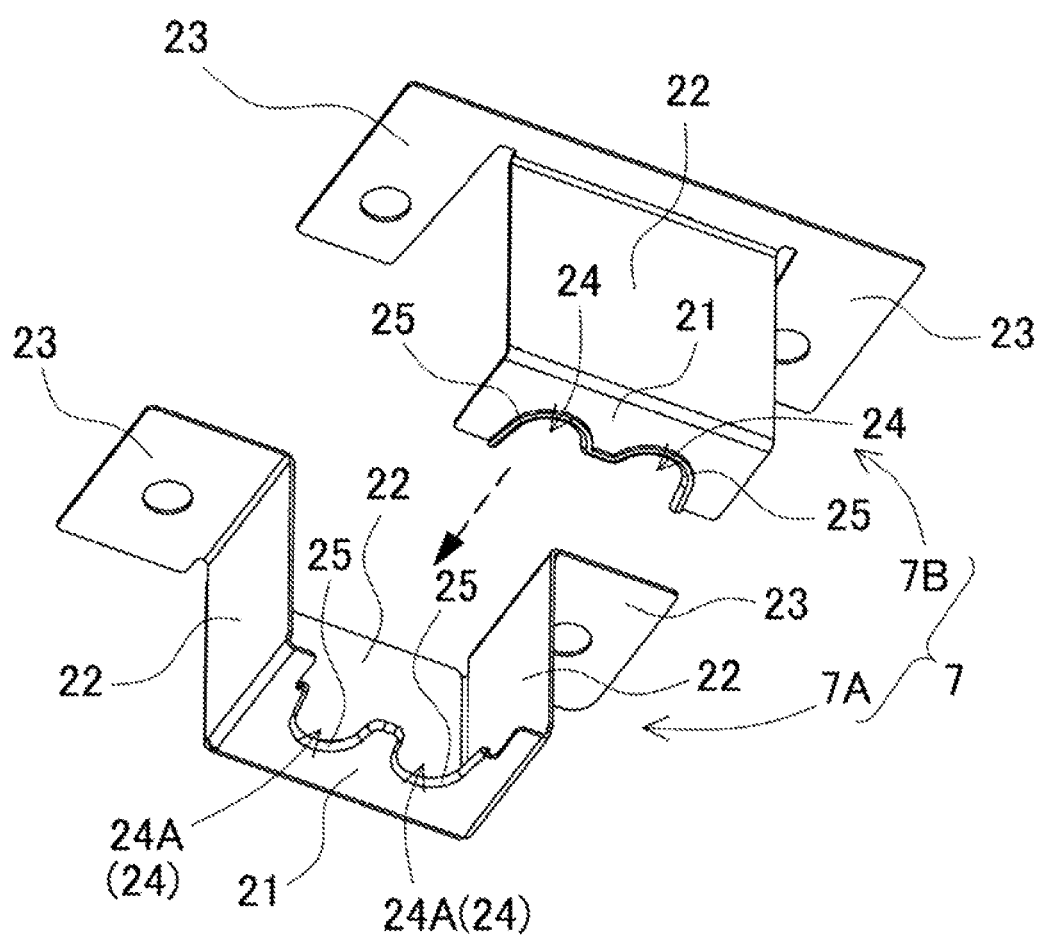
FIG. 5 is an exploded perspective view of the heat-shielding plate shown in FIG. 4.

FIGS. 3-5 show the heat-shielding plate 7 that establishes the thermal isolation region 8, which opens upward in the figures. The heat-shielding plate 7 shown in these and other figures has two metal plate pieces that join to form a box-shaped rectangular opening with a closed bottom where the socket 4 can be mounted. The bottom plate 21 is provided with a plurality of feed-through holes 24 to the run lead-wires 13 that connect to the receiving socket-side connecting terminals 12. Perimeter side-walls 25 are established along the inside edges of the feed-through holes 24. The perimeter side-walls 25 are established by press-forming sheet metal and are made in single-piece construction with heat-shielding plate pieces 7A, 7B. Feed-through holes 24 with perimeter side-walls 25 increase the surface area of the edges of the feed-through holes 24 that contact the lead-wires 13, and prevent damage to the insulating covering on the lead-wire 13 by the edges of the feed-through holes 24. As shown in FIG. 2, the feed-through holes 24 with inserted lead-wires 13 are sealed closed in an air-tight manner by insulating material 15 disposed between the feed-through holes 24 and the lead-wires 13. Insulation such as silicone resin, which is in paste-form in the unhardened state, or heat-resistant tubing etc., can be used as the insulating material 15. Sealing the feed-through holes 24 and the lead-wires 13 in an air-tight manner prevents introduction of air into the thermal isolation region 8 through the feed-through holes 24 and can limit socket 4 and service plug combustion and suppress fire ignition.

The heat-shielding plate 7 shown in FIGS. 3-5 is divided into a plurality of metal plate pieces that form the thermal isolation region 8. The heat-shielding plate 7 of the figures is divided into two metal plate pieces that join to form the thermal isolation region 8. The two metal plate pieces of the heat-shielding plate 7 are provided with feed-through holes 24 on their joining boundaries. The heat-shielding plate piece 7A on one side has a bottom plate piece 21 and three side-walls 22, and the heat-shielding plate piece 78 on the other side has a bottom plate piece 21 and a single side-wall 22. The two heat-shielding plate pieces 7A, 7B are configured to overlap and establish the feed-through holes 24. The bottom plate piece 21 of the heat-shielding plate piece 7A is provided with elongated holes 24A, which extend in the direction for joining the heat-shielding plate pieces 7A, 7B and form the feed-through holes 24. The elongated holes 24A extend to the boundary edge of the heat-shielding plate piece 7A and are shaped to form feed-through holes 24 that can pass the lead-wires 13 when the bottom plate pieces 21 are overlapped. The heat-shielding plate pieces 7A, 7B are put together to overlap the bottom plate pieces 21 with the lead-wires 13 passed through the elongated holes 24A, and flange regions 23 are joined together to establish the thermal isolation region 8 for mounting the socket 4.

Figure 6:
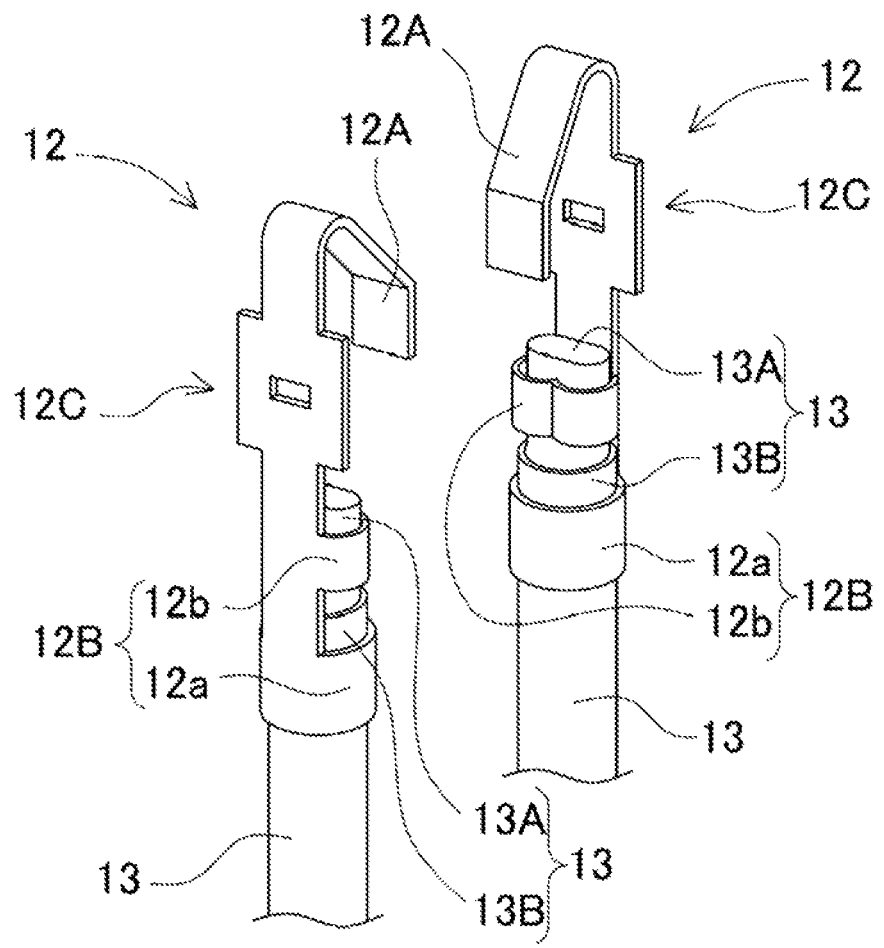
FIG. 6 is an enlarged perspective view of the socket-side connecting terminals.

The socket 4 has receiving socket-side connecting terminals 12 fixed inside a plastic insulating case 16. The socket-side connecting terminals 12 are metal plates that can bend in a resilient manner and connect with service plug 5 connecting terminals 14. An oblique view of the socket-side connecting terminals 12 is shown in FIG. 6. The socket-side connecting terminals 12 have flexible pieces 12A (in the upper part of the figure) that are resiliently pressed by the service plug 5 connecting terminals 14, and are provided with lead-wire 13 connecting sections 12B at their bottom ends to crimp-attach the lead-wires 13. Further, the mid-regions of the socket-side connecting terminals 12 in the figure are provided with attachment segments 12C to hold the socket-side connecting terminals 12 in fixed positions inside the socket 5 insulating case 16. The flexible pieces 12A are formed by bending metal plate material, and as shown in FIG. 2, are resiliently pressed upon by connecting terminals 14 inserted into the insulating case 16 to make electrical connection. The lead-wire 13 connecting sections 12B have cylindrical sleeves 12a where the lead-wires 13 are inserted and held, and crimping sections 12b above the cylindrical sleeves 12a that are crimped onto the conducting parts 13A of the lead-wires 13. The cylindrical sleeve 12a of a socket-side connecting terminal 12 is pressure-attached onto the lead-wire 13 insulating covering 13B, the conducting part 13A of the lead-wire 13 exposed from the end of the insulating covering 136 is inserted into the crimping section 12b, and the crimping section 12b is crimped onto the conducting part 13A of the lead-wire 13 to hold the socket-side connecting terminal 12 in electrical contact with the lead-wire 13.

The insulating case 16 of the socket 4 fits into the thermal isolation region 8, which is sectioned-off from the outer case 3 by the heat-shielding plate 7. The insulating case 16 of the socket 4 is mounted in a fixed position in the thermal isolation region 8. Consequently, the insulating case 16 of the socket 4 has an outline that is essentially the same size as the interior of the thermal isolation region 8. The socket 4 mounted in the outer case 3 has lead-wires 13, which connect the socket-side connecting terminals 12 to the batteries. The lead-wires 13 pass through the feed-through holes 24 provided in the bottom plate 12 of the heat-shielding plate 7.

The service plug 5 has metal plate connecting terminals 14 fixed in a plastic plug-body 17. The plug-body 17 is formed from insulating plastic with a rectangular outline. A pair of connecting terminals 14 is fixed inside the plug-body 17, which covers and insulates the metal connecting terminals 14. In addition, the plug-body 17 has a handle 18 connected to the outside to enable easy plug insertion and removal. The handle 18 is formed from plastic in a U-shape and connects with the plug-body 17 in a manner allowing lever-action inclination. This service plug 5 can be easily removed by pulling the handle 18.

The pair of plug-side connecting terminals 14 inserts into the pair of receiving socket-side connecting terminals 12 in the socket 4 for connection. The two plug-side connecting terminals 14 are connected together inside the plug-body 17. When the service plug 5 is attached in the socket mounted on the outer case 3, the pair of plug-side connecting terminals 14 connects with the socket-side connecting terminals 12. In this state, the two socket-side connecting terminals 12 are connected together to connect the positive-side and negative-side battery blocks 2 in series. When the service plug 5 is removed, the two socket-side connecting terminals 12 are not connected together by the service plug 5, and battery output-voltage is shut-off.

Further, the power source apparatus can also prevent smoke and fire from developing at connectors on the lead-wires, which are battery block output-lines. As shown in FIG. 7, a lead-wire 13 that is a battery block output-line has a connector 30 attached to the end of the wire. The connector 30 of the figure is a metal plate with a through-hole 31A, namely it is a ring terminal 31. The connector 30 is connected to a battery block output terminal or electrical component and carries the power source apparatus output current. As shown in FIG. 7, the ring terminal 31, which is the connector 30, is crimp-attached to the conducting part 13A of the lead-wire 13. The connector 30 of the figure has a cylindrical crimping section 318 that is the connecting region, and the connector 30 is electrically connected to the lead-wire 13 by inserting the conducting part 13A of the lead-wire 13 into a crimping section 31B and applying crimping pressure. For a connector 30 with this structure, it is possible for contact resistance to increase in the connecting region. If contact resistance increases, Joule heating proportional to the contact resistance times the square of the current occurs at the connecting region, and detrimental effects such as smoke and fire generation become a concern.

To prevent these types of detrimental effects, the lead-wire 13 connecting region of the connector 30 shown in the figure is covered with heat-shielding sheet 32. Specifically, the crimping section 31B where the conducting part 13A of the lead-wire 13 is crimp-attached and contact resistance is likely to increase is covered with heat-shielding sheet 32 to prevent smoke and fire generation due to over-heating in that region. Metal sheet such as aluminum sheet is used as the heat-shielding sheet 32. Metal heat-shielding sheet 32 has good ability to withstand heating, superior heat dissipating properties, and can effectively prevent detrimental effects due to connecting region over-heating. As shown in FIG. 7, heat-shielding sheet 32 is wrapped around the connector 30 crimping section 31B to form an air-tight seal around the connecting region. A connector 30 with the lead-wire 13 connecting region covered in an air-tight manner with heat-shielding sheet 32 stops the introduction of air and can effectively prevent smoke and fire generation in the connecting region. Further, by covering the connecting region with metal sheet having superior heat dissipating properties, thermal emission characteristics are improved to achieve efficient heat dissipation. Thermal emission characteristics can be further improved by increasing the overall area of the metal heat-shielding sheet 32. However, since metal sheet is electrically conducting, its overall surface area must be adjusted depending on the attachment location of the connector 30. Therefore, the heat-shielding sheet 32 is made to a size and shape that can cover the most likely to over-heat connecting region between the connector 30 and the conducting part 13A of the lead-wire 13 while adjusting the overall surface area depending on the connector 30 attachment location. Further, the metal heat-shielding sheet 32 can also be made as metal tape with an adhesive layer on its inside surface to make it simple and easy to cover the connecting region in attach a manner that will not unravel.

Figure 8:
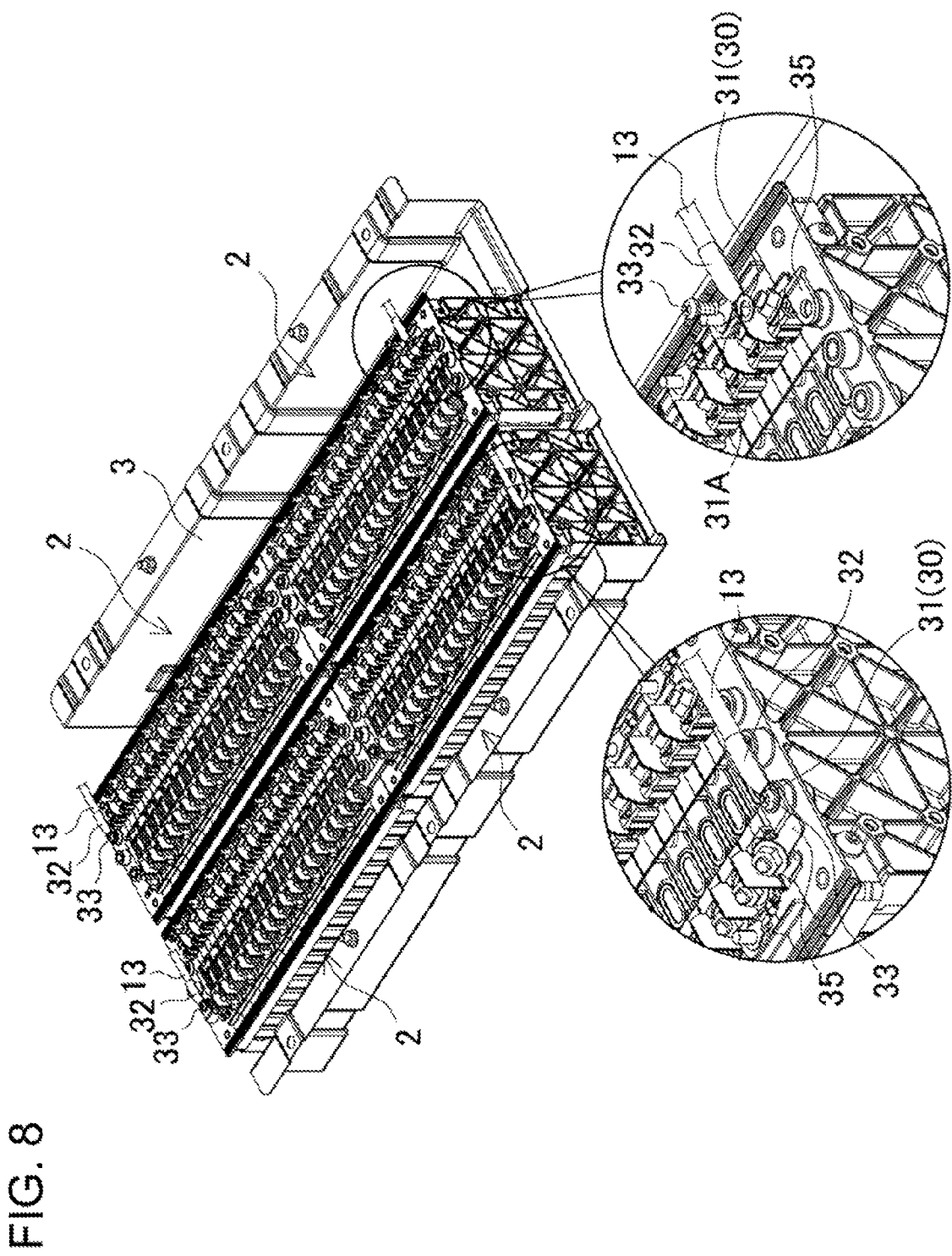
FIG. 8 is a perspective view with enlarged insets showing connection of lead-wire connectors to power source apparatus battery block output terminals.
Figure 9:
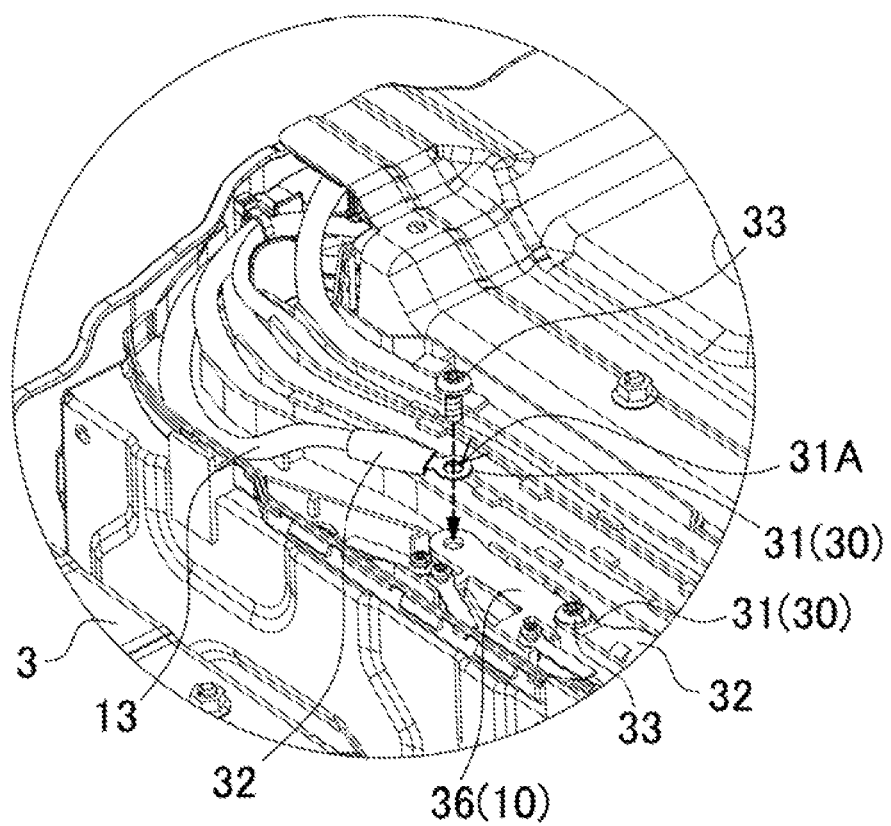
FIG. 9 is an exploded perspective view showing connection of a lead-wire connector to a power source apparatus electrical component.

As shown in FIG. 8, the connector 30 described above is connected to the output-side of a battery block 2, or as shown in FIG. 9, it is connected to an electrical component 10 housed in the outer case 3. FIG. 9 shows connection of connectors 30 to the two ends of a current detection resistor 36. The connector 30, which is a ring terminal 31, is connected to a battery block output terminal 35 or electrical component 10 by a set screw 33 inserted in the through-hole 31A. Since high-current flows through a connector 30 attached in this manner to a power source apparatus battery block output-line, excessive heat generation due to contact resistance is a concern. However, since the connecting region of the connector 30 shown in the figures is covered with heat-shielding sheet 32, that region is deprived of a supply of oxygen preventing smoke and flame generation, and heat generated in the connecting region is dissipated by the superior thermal emission properties of the heat-shielding sheet 32 to restrain heat generation in an ideal manner.

Figure 10:
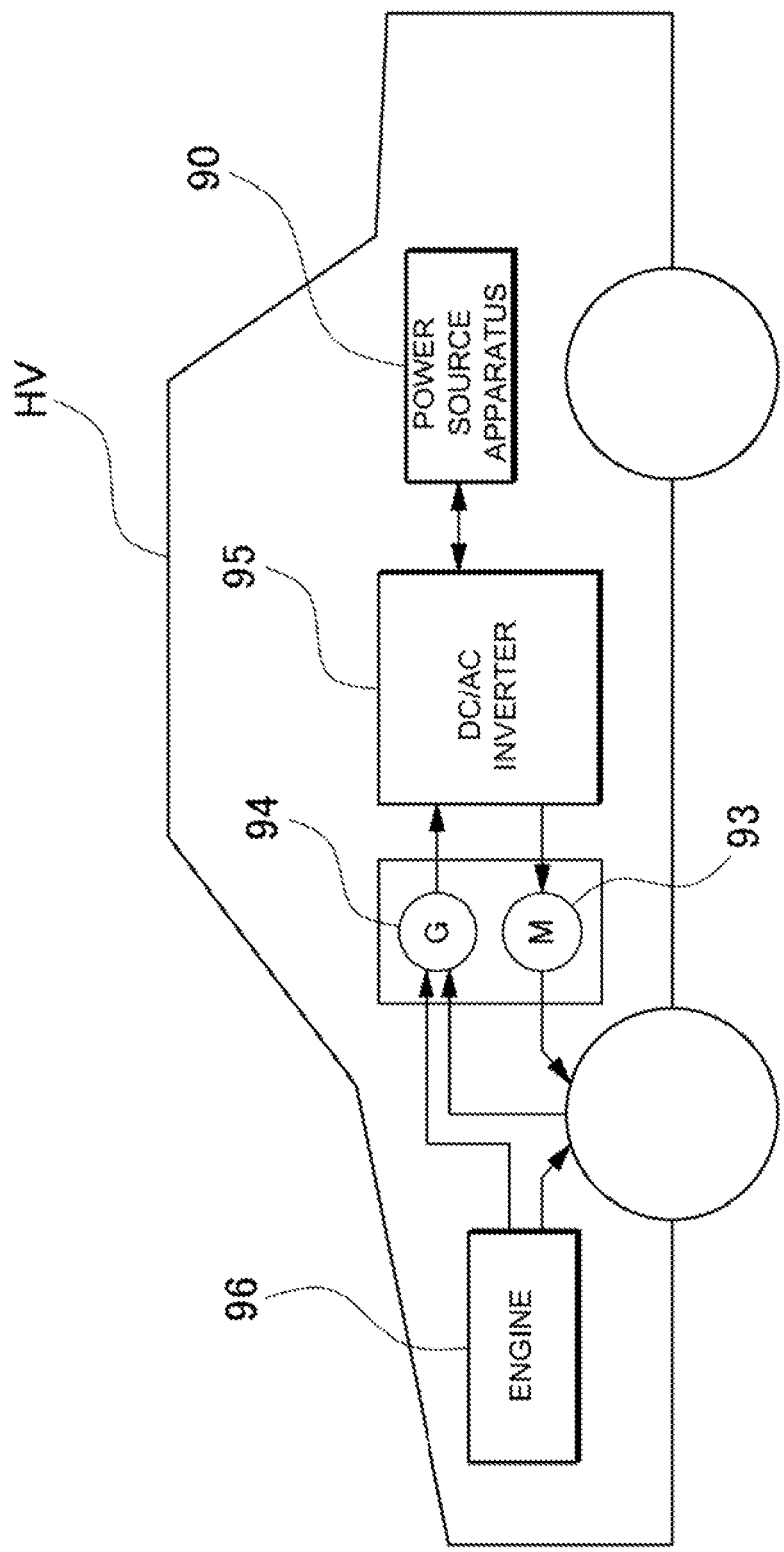
FIG. 10 is a block diagram showing a hybrid vehicle, which is driven by a motor and an engine, as a vehicle for an embodiment of the present invention.

Vehicle installation of the power source apparatus described above is shown in FIGS. 10 and 11. FIG. 10 shows an example of power source apparatus 90 installation on-board a hybrid vehicle, which is driven by both an engine and an electric motor. The vehicle HV carrying the power source apparatus 90 shown in this figure is provided with an engine 96 and a driving motor 93 to drive the vehicle HV, a power source apparatus 90 to supply power to the motor 93, and a generator 94 to charge the power source apparatus 90 batteries. The power source apparatus 90 is connected to the motor 93 and generator 94 via a DC/AC inverter 95. The vehicle HV runs on both the motor 93 and engine 96 while charging the batteries in the power source apparatus 90. In operating modes where engine efficiency is poor such as during acceleration and low speed cruise, the vehicle is driven by the motor 93. The motor 93 operates on power supplied from the power source apparatus 90. The generator 94 is driven by the engine 96 or by regenerative braking when the vehicle brake pedal is pressed and operates to charge the power source apparatus 90 batteries.

Figure 11:
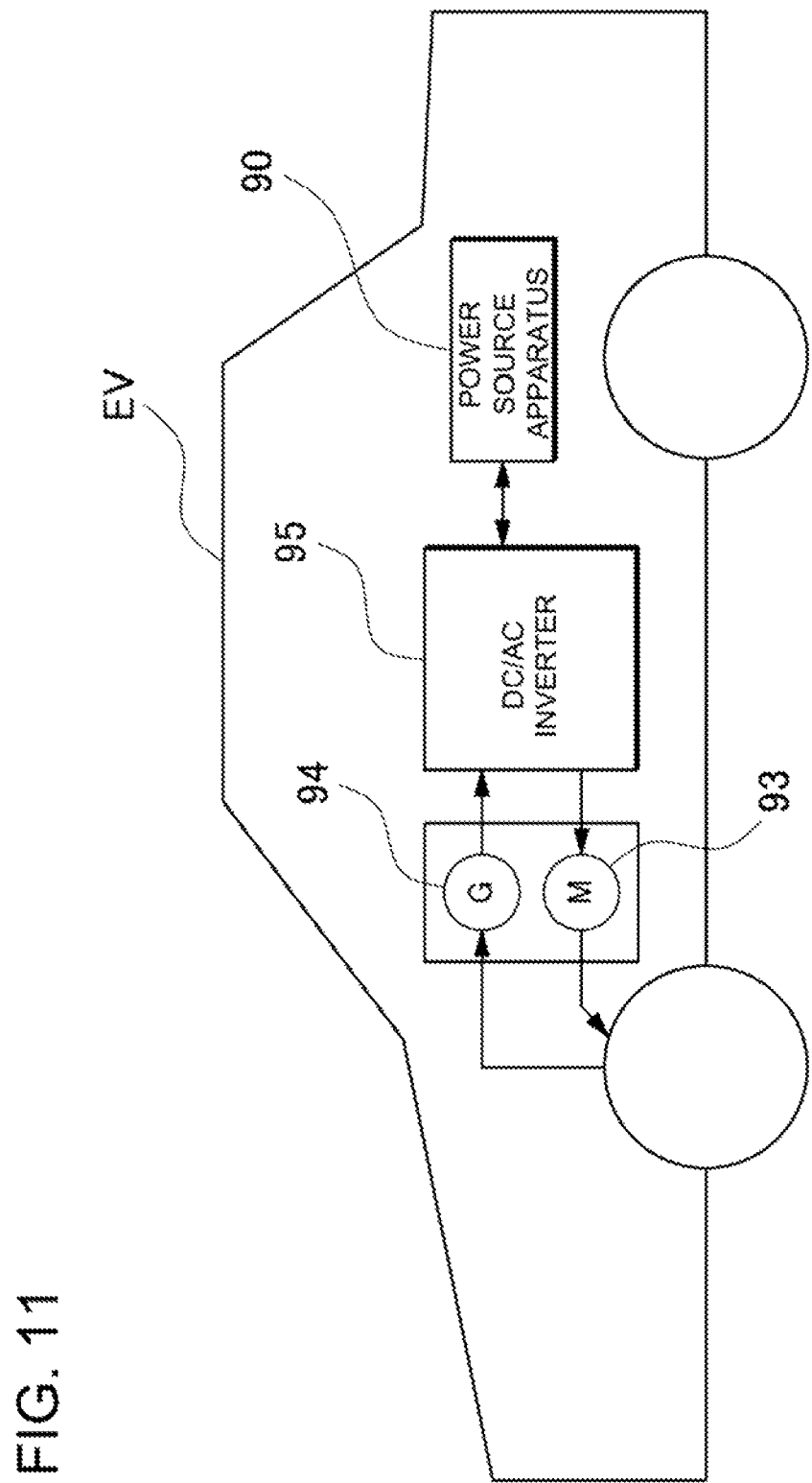
FIG. 11 is a block diagram showing an electric vehicle, which is driven by a motor only, as a vehicle for an embodiment of the present invention.

FIG. 11 shows an example of power source apparatus 90 installation on-board an electric vehicle, which is driven by an electric motor only. The vehicle EV carrying the power source apparatus 90 shown in this figure is provided with a driving motor 93 to drive the vehicle EV, a power source apparatus 90 to supply power to the motor 93, and a generator 94 to charge the power source apparatus 90 batteries. The power source apparatus 90 is connected to the motor 93 and generator 94 via a DC/AC inverter 95. The motor 93 operates on power supplied from the power source apparatus 90. The generator 94 is driven by energy from regenerative braking and operates to charge the power source apparatus 90 batteries. It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2010-287098 filed in Japan on Dec. 24, 2010, the content of which is incorporated herein by reference.

What is claimed is:

1. A power source apparatus comprising:
    a plurality of battery blocks that each have a plurality of battery cells connected together;
    an outer case that houses the battery blocks and/or electrical components connected to the battery blocks;
    a socket connected electrically in series with the battery blocks and disposed at the outer case;
    a heat-shielding plate disposed between the socket and the outer case; and
    a service plug that connects with the socket in a removable manner,
    the service plug being connected electrically in series with the battery cells via the socket when the service plug connects with the socket;
    wherein the outer case is provided with a socket and service plug thermal isolation region sectioned-off by the heat-shielding plate, and the socket and service plug are disposed in the thermal isolation region, and
    wherein the service plug is configured to be apart from and electrically insulated from the heat-shielding plate when the service plug is attached to the socket to electrically connect with the battery cells.

2. The power source apparatus as cited in claim 1, wherein the heat-shielding plate is disposed in an opening in the outer case, and the heat-shielding plate establishes the thermal isolation region, and the socket is attached in the thermal isolation region.

3. The power source apparatus as cited in claim 1 wherein the heat-shielding plate is made of metal.

4. The power source apparatus as cited in claim 1, wherein the heat-shielding plate is formed of a non-magnetic material.

5. The power source apparatus as cited in claim 1, wherein the heat-shielding plate that forms the thermal isolation region has feed-through holes to run lead-wires, the lead-wires are passed through the feed-through holes, and the feed-through holes are sealed so as to be closed in an air-tight and insulating manner.

6. The power source apparatus as cited in claim 5, wherein perimeter side-walls are established along insides of the feed-through holes.

7. The power source apparatus as cited in claim 5, wherein the thermal isolation region is formed by the heat-shielding plate which is divided into a plurality of pieces, and the feed-through holes are established on boundaries of the plurality of heat-shielding plate pieces.

8. The power source apparatus as cited in claim 1, wherein the outer case, with the socket attached, houses an output cut-off connected in series with the battery blocks, a current detection section for detecting battery cell current, and/or a circuit board carrying electronic circuitry connected to the battery cells.

9. A vehicle with the power source apparatus as cited in claim 1 installed on-board.

10. A power source apparatus comprising:
    a plurality of battery blocks, each of the battery blocks including a plurality of battery cells connected together;
    an outer case housing the battery blocks and/or electrical components connected to the battery blocks;
    a socket including socket-side terminals and an insulating case for housing the socket-side terminals, the insulating case being disposed at the outer case;
    a service plug including plug-side terminals and a plastic plug-body for housing the plug-side terminals,
    wherein the plastic plug-body is attached to the insulating case of the socket in a removable manner, and the plug-side terminals are connected with the socket-side terminals when the plastic plug-body is attached to the insulating case; and
    a heat-shielding plate disposed between the outer case and the insulating case of the socket, wherein the heat-shielding plate is isolated from the socket-side terminals via the insulating case of the socket.

11. The power source apparatus as cited in claim 2, wherein the socket is configured to be disposed inside an opening of the outer case and extend over a surface of the outer case around the opening.

* * * * *